(12) United States Patent
Tian et al.

(10) Patent No.: US 11,750,450 B1
(45) Date of Patent: Sep. 5, 2023

(54) METHODS AND SYSTEMS FOR NETWORK CONFIGURATION IN STORAGE ENVIRONMENTS

(71) Applicant: Veritas Technologies LLC, Santa Clara, CA (US)

(72) Inventors: Hui Tian, Beijing (CN); Hao Dong, Tianjin (CN); Qing Zhang, Beijing (CN)

(73) Assignee: Veritas Technologies LLC, Santa Clara, CA (US)

(*) Notice: Subject to any disclaimer, the term of this patent is extended or adjusted under 35 U.S.C. 154(b) by 0 days.

(21) Appl. No.: 17/086,974

(22) Filed: Nov. 2, 2020

(51) Int. Cl.
*H04L 12/70* (2013.01)
*H04L 41/0806* (2022.01)
*H04L 41/12* (2022.01)
*H04L 67/1097* (2022.01)
*H04L 61/50* (2022.01)

(52) U.S. Cl.
CPC .......... *H04L 41/0806* (2013.01); *H04L 41/12* (2013.01); *H04L 61/50* (2022.05); *H04L 67/1097* (2013.01)

(58) Field of Classification Search
CPC ..... H04L 41/0806; H04L 41/12; H04L 61/20; H04L 67/1097
USPC ........................................................ 370/254
See application file for complete search history.

(56) References Cited

U.S. PATENT DOCUMENTS

| | | | | |
|---|---|---|---|---|
| 8,086,760 | B1* | 12/2011 | Gruttadauria | ....... H04L 67/1097 710/16 |
| 11,386,115 | B1* | 7/2022 | Raghavan | ........... G06F 16/2282 |
| 2008/0031238 | A1* | 2/2008 | Harmelin | ........... H04L 41/0843 370/389 |
| 2009/0073984 | A1* | 3/2009 | Jackson | .............. H04L 41/0803 725/37 |
| 2011/0075591 | A1* | 3/2011 | Cheshire | ................. H04L 67/34 370/255 |
| 2014/0364510 | A1* | 12/2014 | Lichter | .............. A61K 31/5377 514/772.1 |
| 2017/0168811 | A1* | 6/2017 | Petri | ......................... G06F 9/46 |
| 2017/0180305 | A1* | 6/2017 | Seine | ................... H04L 61/103 |
| 2017/0237608 | A1* | 8/2017 | Wu | ..................... H04L 61/5014 709/220 |
| 2017/0322787 | A1* | 11/2017 | Patidar | ...................... G06F 8/61 |
| 2018/0139104 | A1* | 5/2018 | Seddigh | ............. H04L 41/0213 |
| 2019/0356541 | A1* | 11/2019 | Finn | ..................... G06F 9/4416 |

(Continued)

*Primary Examiner* — Joe Chacko
*Assistant Examiner* — Elizabeth Kassa
(74) *Attorney, Agent, or Firm* — WOMBLE BOND DICKINSON (US) LLP

(57) ABSTRACT

Methods, computer program products, computer systems, and the like are disclosed that provide for storage network configuration and maintenance in an efficient and effective manner. For example, such methods, computer program products, and computer systems can include selecting a selected network interface of a plurality of network interfaces of a node, generating a configuration package, and sending the configuration package on the selected network interface. In such embodiments, the node is one of a plurality of nodes in a storage cluster, and communicates with one or more other nodes of the plurality of nodes via the selected network interface. The configuration package includes a node identifier and node configuration information. The node identifier uniquely identifies the node among the plurality of nodes.

19 Claims, 12 Drawing Sheets

(56) References Cited

U.S. PATENT DOCUMENTS

2020/0076685 A1* 3/2020 Vaidya ................ H04L 61/3015
2021/0073089 A1* 3/2021 Sathavalli ........... G06F 11/2074

* cited by examiner

METHODS AND SYSTEMS FOR NETWORK CONFIGURATION IN STORAGE ENVIRONMENTS

FIELD OF THE INVENTION

The present disclosure relates to storage systems, and more specifically, to methods and systems for network configuration and management in storage environments.

BACKGROUND

An ever-increasing reliance on information and computing systems that produce, process, distribute, and maintain such information in its various forms, continues to put great demands on techniques for providing data storage, accessing that data storage, and protecting the data thus stored. Business organizations can produce and retain large amounts of data. While data growth is not new, the pace of data growth is continually increasing, the location of data more dispersed, and linkages between datasets more complex. Concurrently, in order to manage and store such increasingly voluminous and complex data, data storage systems have also increased in complexity. Such increased complexity can be seen in the storage hardware, networking thereof, and software employed both to store the data in question and manage such storage. In light of these constraints, mechanisms and approaches directed to simplifying such configuration and management have become increasingly desirable.

SUMMARY

The present disclosure describes methods, computer program products, computer systems, and the like that provide for storage network configuration and maintenance in an efficient and effective manner. Such methods, computer program products, and computer systems include selecting a selected network interface of a plurality of network interfaces of a node, generating a configuration package, and sending the configuration package on the selected network interface. In such embodiments, the node is one of a plurality of nodes in a storage cluster, and communicates with one or more other nodes of the plurality of nodes via the selected network interface. The configuration package includes a node identifier and node configuration information. The node identifier uniquely identifies the node among the plurality of nodes.

In certain embodiments, such a method can include generating the node identifier, where the node identifier is generated by the node and the node identifier is unique to the node. Such embodiments can further include determining the node configuration information. In certain of those embodiments, the node configuration information comprises at least one of a hardware type, a protocol type, or an operation. Such embodiments can also provide for the node being a sender node, with the node configuration information further including a sender hardware address and a sender hardware address. Such embodiments can further provide for the one or more other nodes of the plurality of nodes being a target node, and the node configuration information further including a target hardware address and a target hardware address.

In certain embodiments, such a method can include identifying the plurality of network interfaces of the node. In certain other embodiments, such a method can include receiving a received configuration package, extracting a sending node identifier from the configuration package, and extracting network information from the configuration package. In such embodiments, the received configuration package can have been sent by a sending node that is one of the plurality of nodes other than the node. The sending node identifier uniquely identifies the sending node among the plurality of nodes In other embodiments, such a method can further include determining a topology of the storage cluster. In such embodiments, the topology of the storage cluster is determined based, at least in part, on the network information. Further, in such embodiments, the selecting, the generating, and the sending are performed contemporaneously with the receiving, the extracting the sending node identifier, and the extracting the network information. The network information can include network address information. The network address information can include a network address of the sending node. In certain embodiments, the received configuration package is one of a plurality of received configuration packages and each of the plurality of received configuration packages comprises a corresponding sending node identifier of a plurality of sending node identifiers and a corresponding network address of a plurality of network addresses, and such methods can further include determining a topology of the storage cluster, where the topology of the storage cluster is determined based, at least in part, on the plurality of sending node identifiers and the plurality of network addresses.

In still other embodiments such methods can further include performing a node initialization process. In such embodiments, such a node initialization process can include configuring one or more data service connections, selecting a connection types for each of the one or more data service connections, and selecting one or more connections of the one or more data service connections to be used to perform the sending.

The foregoing is a summary and thus contains, by necessity, simplifications, generalizations, and omissions of detail; consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

Embodiments of methods and systems such as those disclosed herein may be better understood, and its numerous objects, features, and advantages made apparent to those skilled in the art by referencing the accompanying drawings.

Figure 1:
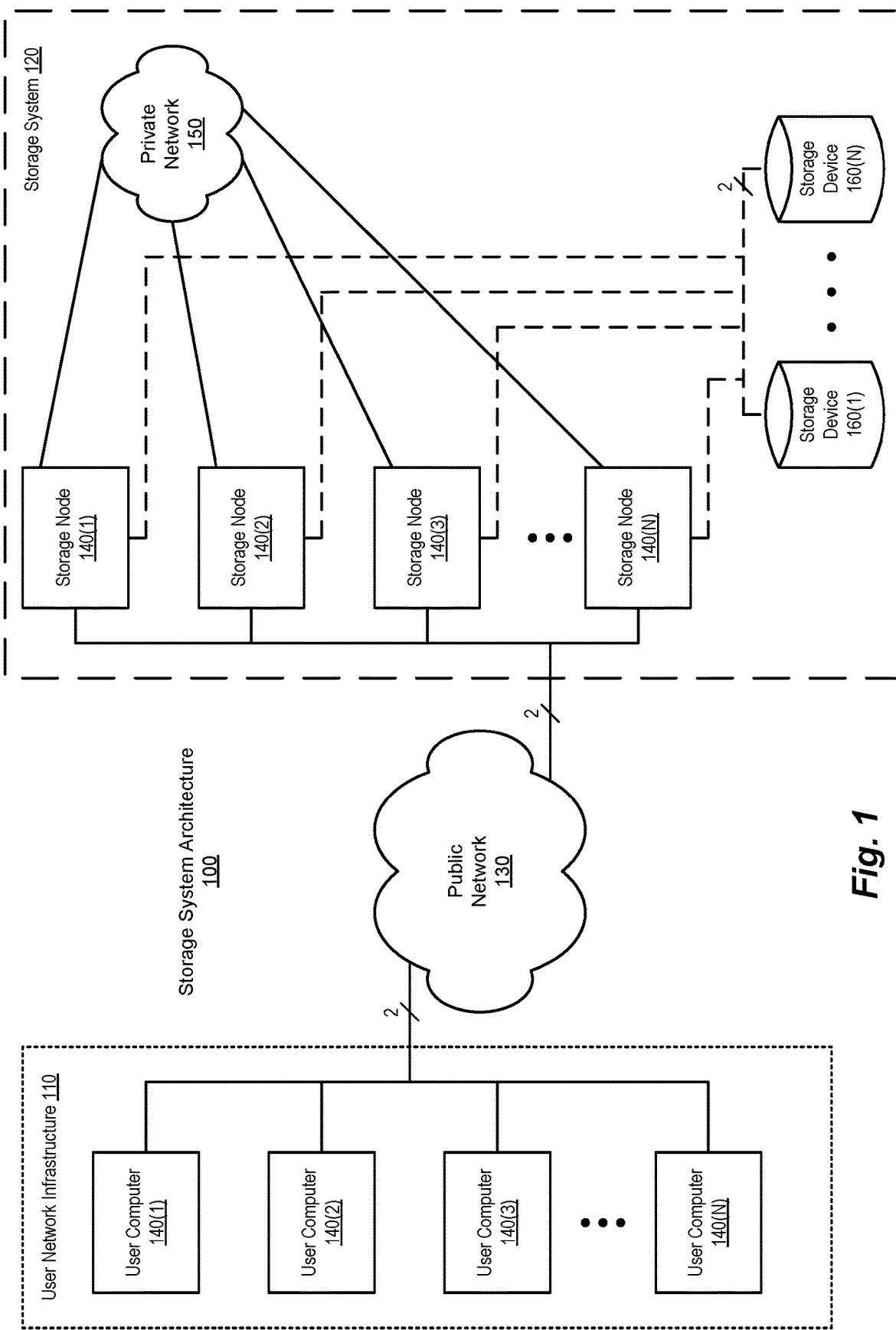
FIG. 1 is a simplified block diagram illustrating components of an example storage system architecture, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

The following is intended to provide a detailed description and examples of the methods and systems of the disclosure, and should not be taken to be limiting of any inventions described herein. Thus, because the methods and systems described herein are susceptible to various modifications and alternative forms, it will be appreciated that specific embodiments are provided as examples in the drawings and detailed description. It should be understood that the drawings and detailed description are not intended to limit such disclosure to the particular form disclosed. Instead, the intention is to cover all modifications, equivalents and alternatives falling within the spirit and scope of the appended claims.

INTRODUCTION

Methods and systems such as those described herein provide for network configuration and management in storage environments. Broadly, the concepts described herein are applicable to the communication and storage of data, and more particularly, to methods and systems for configuring one or more nodes of a storage cluster by selecting a selected network interface of a plurality of network interfaces of a node (where the node is one of the nodes of a storage cluster, and communicates with one or more of the other nodes of the storage cluster via the selected interface), generating a configuration package, and sending the configuration package on the selected interface. In certain embodiments, such a configuration package includes a node identifier and node configuration information. The node identifier uniquely identifies the node among the plurality of nodes. In so doing, embodiments of such methods and systems provide mechanisms for a simplified approach to configuring network connection topologies (e.g., within a storage cluster), the automatic discovery of such network topologies, and efficient data transmission protocols and frame formats. And while the methods and systems described herein are discussed, at points, in terms of their use in a storage cluster architecture, it will be appreciated that such methods and systems can be applied in other network architectures and provide advantages such as those described herein.

In so doing, methods and systems such as those described herein provide flexible, efficient, and effective techniques for the configuration and management of nodes in storage environments such as a storage cluster, for example. There are numerous situations in which, for a variety of reasons, the current state of network configuration and management (e.g., storage cluster configuration and management) is cumbersome and error-prone. For example, in the configuration of reliable storage clusters, network configuration is complex and labor-intensive. Network administrators, engineers, and the like are required to carefully design and implement storage cluster network connections, and manually set up the network configuration in an individual, one-by-one manner. This is because, in a reliable storage cluster, the networks involved (and the nodes' interfaces thereto) necessitate several functions be performed by the nodes' network interfaces. Such network interfaces, in one example, include:

1. A local maintenance network interface;
2. A local host management network interface;
3. Two private network interfaces (main and backup); and
4. Two public network interfaces (main and backup).

In this regard, manually configuring (what are typically) numerous network interfaces of the storage cluster nodes necessitates careful design and implementation, as well as the careful configuration of each network interface, selected from the above network types, and then connecting these network interfaces to the correct path. For example, in a UNIX (or UNIX-like) operating system, devices representing network interfaces may be identified only by cryptic device names (e.g., device names such as "eth1" or "eth7"), which provide no information as to characteristics of the hardware represented thereby (e.g., high-/low-bandwidth, type of network hardware, protocols used, and/or the like). Thus, when viewing such device names in an operating system, a user has no way to easily determine the characteristics of the network represented by a given construct. Compounding this problem is the fact that manufacturers of such systems often pre-configure such hardware and software, and so must provide end-users with highly specific instructions as to the network connections between such systems and other components of the system being built, and so, making errors all the more likely. Moreover, such device names may change as a result of user action, operating system upgrades, and other causes, resulting in further confusion and errors.

As will be appreciated in light of the present disclosure, such characteristics would, at a minimum, need to be known in advance, and manually configured in advance of their use. And, once configured in this manner, the proper connection of such network devices to the proper networks in the proper manner becomes fixed. Further, once connected and configured, such network connections must be tested, before putting the storage cluster or other system into operation.

As will also be appreciated in light of the present disclosure, mistakes in storage network design and configuration are therefore easily made. Such problems are also encountered in the daily maintenance such storage clusters involve (e.g., one or more network cables may have been broken and need replacement, be connected to the wrong network device, topology may change (e.g., by the addition of one or more nodes to the storage cluster), or other such cause). Other sources of mistaken connection, failure, and the like also exist. Thus, the setup and maintenance of a reliable storage cluster is a complex and resource-intensive endeavor.

Such issues are complicated by the inflexible set up of certain existing storage appliances due to predefined hardware, as an example (and as is often the case in, for example, a storage appliance or other such computing system represented by the nodes described herein, though in fact, such nodes may be implemented using physical hardware or virtual machines, or a combination thereof). In such cases, a manufacturer may provide specialized custom software with such an appliance (e.g., to determine a bus identifier of a network interface card installed in a peripheral component interconnect (PCI) bus, special software is needed to obtain the requisite information). This information can then be used to manually configure storage network connections individually, on a one-by-one basis. In such systems, the configured network interface is fixed, and occupies a defined network card location and fixed PCI bus identifier (PCI ID), which is not user-configurable. If this PCI ID is changed, the network interface name will change, resulting in such custom software failing (e.g., dependency software failing). Even at that, such software cannot address misconnected network cables and other such sources based in human error. As will be appreciated in light of the present disclosure, data and management servers are highly dependent on the stability of the storage network's topology. Further still, a software solution provides a much more flexible and easily-upgraded approach to such situations.

Methods and systems such as those described herein address the foregoing issues and others by providing techniques for network configuration and management in storage environments through the communication of configuration packages between storage cluster nodes, which allow such storage cluster nodes to make determinations as to the topology of the given storage system (e.g., the topology of the given storage network).

Such methods and systems can be implement using the following approach to configure the storage network in question:
- Connect appliance nodes to correct network by connecting to the proper network device (though the exact port to which the interface is connected is not critical, as has been the case).
- Power-on storage cluster nodes. These nodes communicate with each other regarding which local private protocol to be used to distinguish the network interface like eth1~eth7. (Such a protocol can employ AVAHI, for example, which is a system which enables programs to publish and discover services and hosts running on a local network; for example, a user can plug a computer into a network and have AVAHI automatically advertise the network services running on its machine, facilitating user access to those services.)
- The node negotiates its status as a master node, in order to configure other nodes.
- Master node configures other nodes (e.g., IP address of eth1~7).
- If error occurs in a master node, administrator can be sent an error message from the master node.
- The nodes of the storage cluster should be physically connected to various network devices in the proper manner. This can be facilitated by color coding or other mechanism(s) (e.g., through the use of different color cables/network connectors, labeling, or other such identification to represent different networks, and/or the like) that avoid a given network interface of a given node being connected to the wrong network device. However, through the implementation and use of methods and systems such as those described herein, implementation and use of such mechanisms are made possible as a result of the methods and systems such as those described herein, thereby simplifying the connection of such nodes to the proper network devices, and so avoiding errors in the physical connections made thereby. It will be further appreciated that, as between low bandwidth network interfaces (e.g., Tree Protocol (TP)) and high bandwidth network interfaces (e.g., Fibre Channel), physical differences in the connectors used by such different networking standards may prove advantageous in distinguishing between networks in certain embodiments. Further, it is to be understood that, while only two network types (TP and Fibre Channel) are described in connection with such storage cluster architectures, extension to three or more network types will be apparent in light of the present disclosure.

Failures and changes can be detected in a number of ways. For example, if all of a node's network connections go dark, it can be assumed that the node in question (e.g., the master node) has suffered some failure resulting in such loss of connectivity. Similarly, network interfaces (e.g., network ports) that are no longer connected to another node (or, conversely, become connected to a new node (or different node)) can be detected. Once detected, the nodes of the storage cluster can use techniques such as those described herein to discover and adapt to such changes.

Advantageously, the methods and systems presented herein provide a quick and scalable method to configure network interfaces in a storage appliance (also more simply referred to herein as a node), which needn't depend on inflexible network interface information (e.g., PCI bus ID of such network interfaces). Further still, such techniques obviate the need for the collection of hardware information. Moreover, when implemented as installable software, such techniques can provide for the direct installation of such software on storage cluster nodes and the automatic configuration of the storage network, as well as providing an interface for accessing the software. Using such techniques, and thus providing for the automatic detection of storage system topology and configuration thereof (and thus, maintenance thereof, as well), such techniques simplify the design, implementation, and physical configuration of such storage systems.

Using such techniques, a reliable storage cluster network can be deployed more quickly, while reducing the cost of their maintenance. Further, end-users needn't be burdened with specialized training or the need for special skills, because the configuration details are hidden by the automatic nature of the solution.

Example Storage System Architecture

In one embodiment, a reliable storage cluster network is implemented that includes:
1. A local maintenance network;
2. A local host management network;
3. One or more private networks; and
4. One or more public networks.

Thus, in such an implementation, each node in the storage cluster has the following network interfaces:
1. A local maintenance network interface;
2. A local host management network interface;

3. One or more private network interfaces (e.g., network interfaces to a main private network and a backup private network, as between nodes); and 4. One or more public network interfaces (e.g., network interfaces to a main public network and a backup public network, as between the nodes and the public network(s) in question).

FIG. 1 is a simplified block diagram illustrating components of an example storage system architecture, according to one embodiment. FIG. 1 thus depicts a storage system 100, in which a user network infrastructure 110 (which, in turn, includes a number of user computers, depicted in FIG. 1 as user computers 115(1)-(N), and referred to in the aggregate as user computers 115) and a storage system 120. User network infrastructure 110 and storage system 120 are communicatively coupled to one another by, for example, a public network 130. In certain embodiments, devices in user network infrastructure 110 and devices in storage system 120 are communicatively coupled to public network 130 by multiple networks (an example in which each of user network infrastructure 110 and devices in storage system 120 is communicatively coupled to public network 130 by two such networks, depicted by the "bus notation" of a "/" with a number, such as the "/2" illustrated in FIG. 1).

In turn, storage system 120 includes a number of storage nodes (depicted in FIG. 1 as storage nodes 140(1)-(N), and referred to in the aggregate as storage nodes 140; where such storage nodes are referred to, more simply, as nodes subsequently herein, an example of which is a storage appliance). Storage nodes 140 can be communicatively coupled to one another by one or more private networks (an example of which is depicted in FIG. 1 as a private network 150). Private network 150 provides for network communications between ones of storage nodes 140. Storage system 120 also includes one or more storage devices (depicted in FIG. 1 as storage devices 160(1)-(N), and referred to in the aggregate as storage devices 160). Storage nodes 140 can be communicatively coupled to store data to and retrieve data from storage devices 160 by way of one or more networks. In a manner similar to that just described in connection with network interfaces to public network 130, storage nodes 140 are depicted as being communicatively coupled to storage devices 160 by two such networks, depicted by the "bus notation" of "/2" illustrated in FIG. 1. As noted earlier, while use of the methods and systems described herein are discussed in the context of the networks, nodes, and other components of a storage cluster, it will be appreciated that such methods and systems can be applied to equally good effect in any computer system architecture in which multiple networks are employed.

As will be appreciated from the foregoing, the letter N is used to indicate a variable number of devices or components. For example, a variable number of clients are implemented in the storage cluster. Although the letter N is used in describing a variable number of instances of each of these different devices and components, a repeated use of the letter N does not necessarily indicate that each device and component has a same number of N instances implemented in the storage cluster.

Further, in light of the present disclosure, it will be appreciated that storage devices such as storage devices 160 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, such systems (e.g., storage clusters) and networks can include other components such as routers, firewalls and the like that are not germane to the discussion of the present disclosure and will not be discussed further herein. It will also be appreciated that other configurations are possible.

Figure 2:
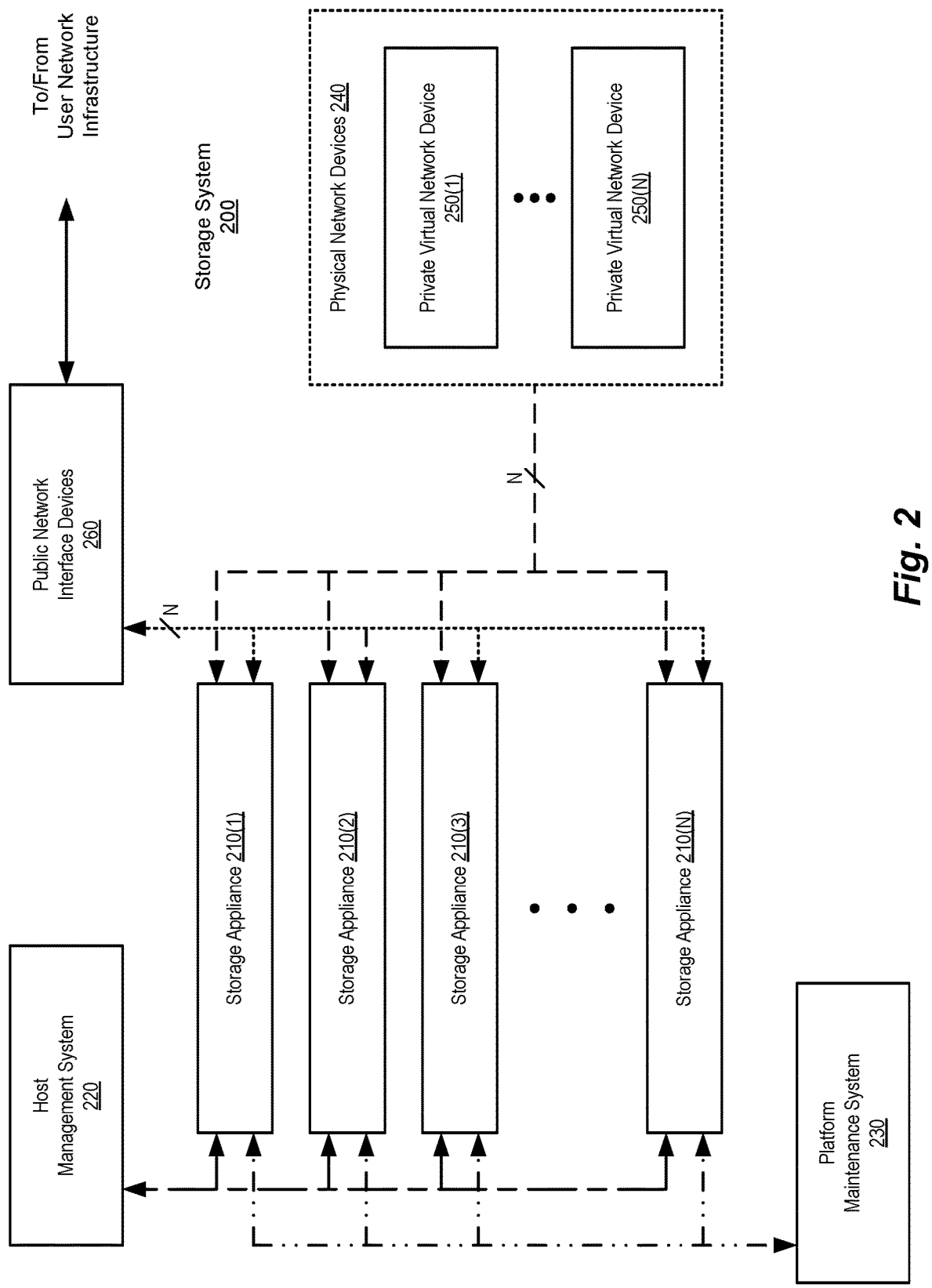
FIG. 2 is a simplified block diagram illustrating components of an example storage system, according to one embodiment.

FIG. 2 is a simplified block diagram illustrating components of an example storage system, according to one embodiment. FIG. 2 thus depicts a storage system 200 and the components thereof. In the manner of storage system 120, storage system 200 includes a number of nodes (depicted in FIG. 2 as storage appliances 210(1)-(N), and referred to in the aggregate as storage appliances 210), which can be accessed by a host management system 220 and a platform maintenance system 230. Various ones of storage appliances 210 are able to communicate with one another via one or more networks (as demonstrated by the "bus notation" of "/#", where "#" is the number of items (e.g., networks)) as supported by a number of physical network devices 240. In reference to the example discussed earlier, "/2" indicates two networks, for example, one main network and one backup network. Physical network devices 240 can include, for example, one or more private virtual network devices (depicted in FIG. 2 as private virtual network devices 250(1)-(N), and referred to in the aggregate as private virtual network devices 250), to which various ones of storage appliances 210 are connected. Each of storage appliances 210 are also connected to one or more public network interface devices (represented by, in FIG. 2, public network interface devices 260), which allow storage appliances 210 to be accessed by a user network infrastructure such as that depicted in FIG. 1.

As will be appreciated in light of the present disclosure, the various networks described in connection with FIG. 1 are separate from one another, and their multiplicity only compounds the problems extant within the design, configuration, and maintenance of such storage systems. This is particularly true where, from the perspective of the user interface of an operating system, the constructs representing each such network cannot (or, at the least, are not) susceptible to human interpretation of the real-world networks each such construct represents (e.g., network interfaces, protocols, and the like). Whereas these and the other aforementioned problems result from the labor-intensive and error-prone approaches described earlier, methods and systems such as those described herein not only address such issues, but avoid such problems to begin with, thanks to the nature of these solutions. For example, the various networks of FIG. 1 are shown in respective style of dashed lines, one for each such network. Similarly, such methods and systems allow for color coding of cables and network devices (or other such approach) that greatly simplifies the physical implementation and maintenance of such networks, as a result of allowing each node to make determinations as to its network connections in an automatic, effective, and efficient manner.

Figure 3:
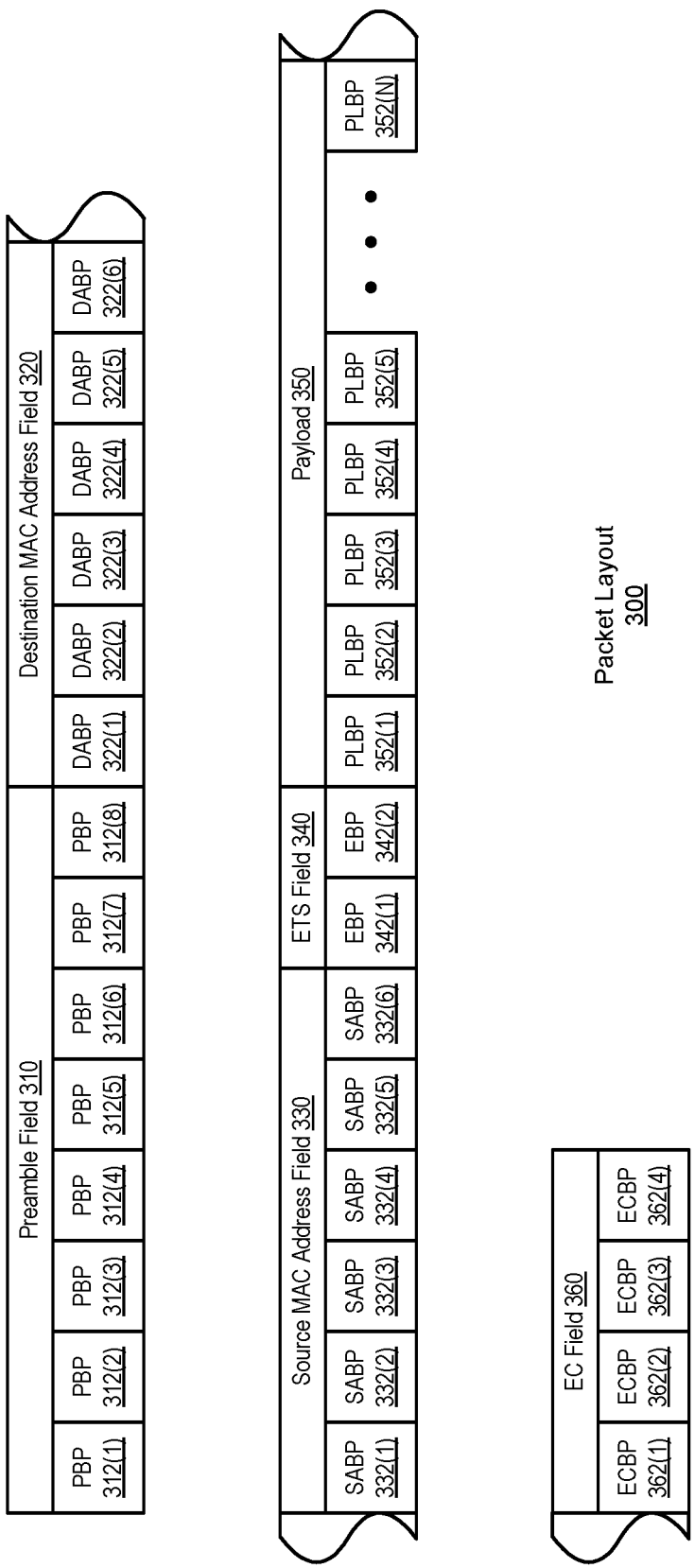
FIG. 3 is a simplified block diagram illustrating an example packet layout, according to one embodiment.

FIG. 3 is a simplified block diagram illustrating an example packet layout, according to one embodiment. FIG. 3 thus depicts a packet layout 300, which serves as an example of the fields that certain portions of a configuration packet according to methods and systems such as those described herein can be used to generate and implement in the configuration and maintenance of a storage system according thereto. As depicted in FIG. 3, packet layout 300 includes a preamble field 310 (which, in turn, includes preamble bit positions (PBP) 312(1)-(8), referred to in the aggregate as PBP 312), a destination address field 320

(which, in turn, includes destination address bit positions (DABP) 322(1)-(6), referred to in the aggregate as DABP 322)), a source address field 330 (which, in turn, includes source address bit positions (SABP) 332(1)-(6), referred to in the aggregate as SABP 332), a type/size field 340 (which, in turn, includes type/size bit positions (TSBP) 342(1)-(2), referred to in the aggregate as TSBP 342), a payload 350 (which, in turn, includes payload bit positions (PLBP) 352(1)-(N), referred to in the aggregate as PLBP 352), and an error correction field 360 (which, in turn, includes error correction bit positions (ECBP) 362(1)-(4), referred to in the aggregate as ECBP 362).

As will be appreciated in light of the present disclosure, destination address field 320 can be, for example, the destination address of the packet in question (e.g., a destination media access control (MAC) address of the packet's intended destination node). Similarly, source address field 330 can be, for example, the source address of the packet in question (e.g., a source media access control (MAC) address of the packet's source node). In certain embodiments, type/size field 340 can be implemented as an Ethernet type/size field (also referred to as a packet's EtherType), indicating which protocol is encapsulated in the payload of the frame and is used at the receiving end by the data link layer to determine how the payload is processed. In the present example, this field can be used to indicate that the information carried by the packet in, for example, its payload (payload 350), described below in connection with Table 1. Error correction field 360 is used to maintain error detection/correction information, such as cyclic redundancy check (CRC) error detection/correction information.

With regard to payload 350, information regarding the configuration package can be provided using a format such as that presented in Table 1. In certain embodiments, in the case of certain implementations based on Internet Protocol version 4 (IPv4), such a configuration package can also be referred to as a MAC package, which is sent to the interface in question.

TABLE 1

Example using a MAC Package Protocol in IPv4.

| Octet offset | 0 | 1 |
|---|---|---|
| 0 | Hardware type (HTYPE) | |
| 2 | Protocol type (PTYPE) | |
| 4 | Hardware addr len (HLEN) | Protocol address length (PLEN) |
| 6 | Operation (OPER) | |
| 8 | Sender hardware address (SHA) (first 2 bytes) | |
| 10 | Sender hardware address (SHA) (next 2 bytes) | |
| 12 | Sender hardware address (SHA) (last 2 bytes) | |
| 14 | Sender protocol address (SPA) (first 2 bytes) | |
| 16 | Sender protocol address (SPA) (last 2 bytes) | |
| 18 | Target hardware address (THA) (first 2 bytes) | |
| 20 | Target hardware address (THA) (next 2 bytes) | |
| 22 | Target hardware address (THA) (last 2 bytes) | |
| 24 | Target protocol address (TPA) (first 2 bytes) | |
| 26 | Target protocol address (TPA) (last 2 bytes) | |
| 28 | Sender unique identifier (first 2 bytes) | |
| 30 | Sender unique identifier (last 2 bytes) | |
| 32 | Sender interface identifier (first 2 bytes) | |
| 34 | Sender interface identifier (last 2 bytes) | |

As reflected in Table 1, in such implementations, a node sends its unique node identifier to each of its network interfaces (with the interface's identifier) to other nodes in the storage cluster. In a manner such as that noted subsequently in connection with FIG. 9 and its description, once a given node has received configuration packages from the other nodes in the storage cluster, the node in question calculates the network topology of the storage cluster, and so, is able to distinguish different functions of its network interfaces (e.g., as between public and private, interface type, speed, and other network interface characteristics).

Table 1 describes an example of a packet format that supports embodiments such as those described herein. Table 1 thus defines an extended Internet Protocol version 4 (IPv4) protocol packet format. Such a packet format can also be extended to Internet Protocol version 6 (IPv6) or other such protocols, and so provide similar function to communicate topology between storage nodes. In Table 1, the Hardware Type (HTYPE) field defines the low-level hardware type. For example, the use of Ethernet is identified with the hardware type of 0x1. Similarly, the Protocol Type (PTYPE) field is defined as the protocol type, and is used to select the configuration package from various available protocol types. As example, a PTYPE of 0x9200 is used herein. The protocol type can change from implementation to implementation. Hardware Length (HLEN) field, for an Ethernet address length, is 6. The value in Protocol Length (PLEN) field indicates the length (in octets) of the network addressing question (e.g., internetwork addresses). For example, when using IPv4, the address length (PLEN) is 4. The Operation field specifies the operation that the sender is performing (e.g., 1 for request, 2 for reply). The Sender hardware address (SHA) field stores the address of the sending node's hardware. For example, in an Address Resolution Protocol (ARP) request, this field is used to indicate the address of the host sending the request. In an ARP reply, this field is used to indicate the address of the host for which the request was intended. The Sender protocol address (SPA) field stores the sender's network address (e.g., the Internetwork address of the sender). The Target hardware address (THA) field stores a value indicating, for example, the media address of the intended receiver. In an ARP request, this field can be ignored. In an ARP reply, this field can be used to indicate the address of the host that originated the ARP request. The Target Protocol Address (TPA) field stores a value indicating the Internetwork address of the intended receiver. The Sender Unique Identifier field stores a value that indicates the network interface sequence number in supported ports type (as here, 1, 2, 3, 4) will appear in each network interface list. The Sender interface identifier field stores information identifying the sender's network interface. For example, the sender's network interface can be TP (e.g., with a value of 0, indicating a low-speed TP interface) or FIBRE (e.g., with a value of 1, indicating a high-speed Fibre Channel interface).

Example Storage Cluster Configuration and Management Processes

As is now described, in one implementation, such processes include two stages:
1) Boot-up initialization
2) Cluster automatic configuration In boot-up initialization, data service connections are configured, connection types selected, and connections to be used for sending configuration packages are selected.

After node boot-up, configuration packages can be exchanged between nodes. Before broadcasting its configuration package, a node prepares node interface information. Each node sends broadcast packages with a unique identifier to different ones of its network interfaces. Concurrently (or simultaneously, even), each node listens for the broadcast of configuration packages from network interfaces. The nodes can send, for example, configuration packages with a unique node identifier and an (optional) cluster identifier to different network interfaces. At same time, a node can listen for configuration packages from other nodes, on its network interfaces. After received the packages, a node can determine network topology and distinguish different functions of its network interfaces.

Configuration of a node's network interface can be accomplished in the following manner. First, the Internet Protocol (IP) address of the intelligent platform management interface (IPMI) is registered (e.g., by media access control (MAC) address), where a dynamic host configuration protocol (DHCP) server can be used to configure the IPMI address.

Second, each node broadcasts a list of interfaces with (mac address, port type) lists on each of its network interfaces, and also listens for other nodes interfaces and checks the MAC address list. By collecting information such as in Table 2 (e.g., nodesA), each node can determine whether each network interface functions correctly.

on the first network of that type encountered in identifying the networks. Alternatively, more sophisticated processes can be employed in this regard, such as choosing the highest bandwidth network of a given type as the main network, and a lower speed version as the backup (e.g., in the case in which 10 Mb, 100 Mb, and 1 Gb Ethernet networks are employed for networks such as a host management network and/or a platform management network, the 1 Gb network could be selected as the main network, the 100 Mb as the first backup network, and the 10 Mb as the second backup network). Further, if the maximum number of a given network type has been reached, that network type need no longer be checked in this regard.

Moreover, using such approaches, methods and systems such as those described herein allow a determination to be made as to which networks such devices are connected. This can be accomplished, for example, by a given node "pinging" (sending a network "ping" message to the gateway connected to a given device (assuming the device is in use)).

TABLE 2

Network connection topology table for Node A.

| I/F IPMI | IPMI Switch | | SEND | TYPE TP | RECEIVE | | | DEVICE NAME |
|---|---|---|---|---|---|---|---|---|
| NIC1 | Local | MAC1 | MAC1A | TP | NONE | — | | |
| NIC2 | MGMT Switch | MAC2 | MAC2A | TP | MAC2B | MAC2C | | eth1 |
| NIC3 | N/A | MAC3 | MAC3A | TP | NONE | | | |
| NIC4 | N/A | MAC4 | MAC4A | TP | NONE | | | |
| NIC5 | Private 1 Switch | MAC5 | MAC5A | Fibre | MAC5B | MAC5C | MAC5D | eth4 |
| NIC6 | Public 1 Switch | MAC6 | MAC6A | Fibre | MAC6B | MAC6C | MAC6D | eth5 |
| NIC7 | Private 2 Switch | MAC7 | MAC7A | Fibre | MAC7B | MAC7C | MAC7D | eth6 |
| NIC8 | Public 2 Switch | MAC8 | MAC8A | Fibre | MAC8B | MAC8C | MAC8D | eth7 |

In the example topology, the storage cluster includes four nodes (nodes A, B, C, and D). In the manner discussed earlier, devices representing network interface cards (NICs) 1-8 may send and receive media access control (MAC) information, and in this example, from each of the four nodes (nodes A, B, C, and D). Thus, the nodes and their interfaces are identified by their MAC addresses (MAC1A-MAC8A, MAC1B-MAC8B, MAC1C-MAC8C, and MAC1D-MAC8D). Further, not only does node A send out its network addresses (e.g., MAC1A-MAC8A), but receives those of nodes with which node A is communicatively coupled (e.g., as by the networks depicted in FIG. 1). The nodes (in this case, node A) are able to determine the type of network to which each device (e.g., a device name in an operating system such as LINUX, UNIX, MICROSOFT WINDOWS, or other operating system) is connected. The network type can be a relatively low-bandwidth network (e.g., TP), a relatively high-bandwidth network (e.g., Fibre Channel), and/or another type of network. Further still, network messages received by a given node can be used to determine the network address of the node and its interface from which the network message has been received. For example, in Table 2, node A can determine which nodes are communicatively coupled to which devices (device name) by examining the MAC address in the message (e.g., configuration packet) received. As will be discussed, in architectures such as those described herein, identification of networks as between main and backup can simply be based For example, if a ping is sent to a public gateway on a given device, and no reply is received, the node can assume that the network is not a public network, and attempt to ping the private gateway. If no response is received again, it can be assumed that there is no connection to the given device.

When pinging gateways in this fashion (and, as will be appreciated in light of the present disclosure, three or more network types are possible in this regard), the main network (also referred to as the primary or active network) and backup network can be identified based on the order of the devices. In such a scenario, the first such network (public or private, for example) can automatically be designated as the primary (active) network for that network type, and one or more subsequent networks of that network type can be designated as backup networks, in the manner noted earlier.

The foregoing is an example of methods and systems according to embodiments such as described herein, which provide for the automatic configuration of nodes in a storage cluster, for example. As will be appreciated in light of the present disclosure, unlike approaches in which devices with the given device names must be manually configured (and typically, by the manufacturer), forcing an end user to connect physical networks in the manner in which such devices have been configured (and so, in addition to being intensive with respect to human resources, also risking misconnection/misconfiguration), approaches such as those described herein avoid both the resource-intensive nature and error-prone problems thereof.

Cluster configuration is then performed. An administrator, engineer, or other personnel can log in to any node (e.g., 4–8) to begin configuration without the need to configure nodes individually (one-by-one). The initial node can be configured as master node to begin cluster configuration. If an error occurs in connection or cluster configuration, an error message can be received in the master node and displayed to the user. Cluster nodes can also be added or removed. For example, when a node is added to the storage cluster, after the node has been connected to the network devices, the master node tests the nodes and informs the added node of each network interface.

Figure 4:
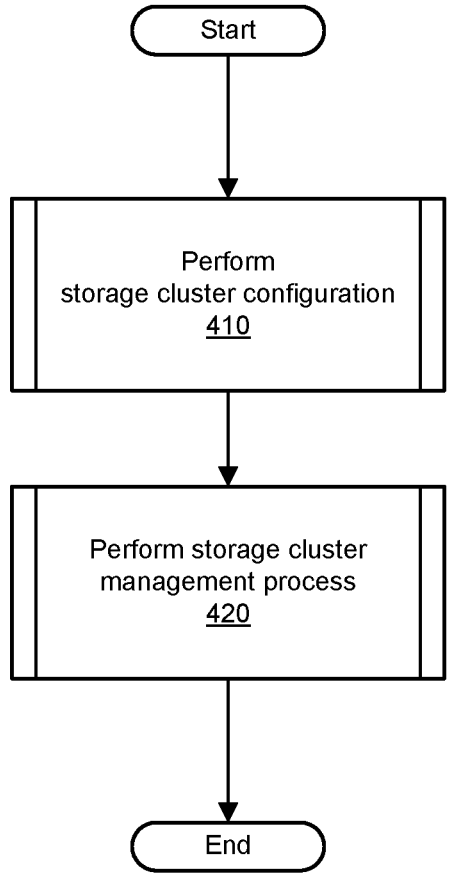
FIG. 4 is a flow diagram illustrating an example of a storage cluster configuration and management process, according to one embodiment.

FIG. 4 is a flow diagram illustrating an example of a storage cluster configuration and management process, according to one embodiment. FIG. 4 thus depicts a storage cluster configuration and management process 400. Storage configuration and management process 400, as its name implies, is directed to performing two basic storage cluster functions according to embodiments such as those described herein, those being configuration and management of the storage cluster. Thus, storage cluster configuration and management process 400 begin by performing storage cluster configuration (410). An example of such a storage cluster configuration process is described in connection with FIGS. 5-9 and their respective descriptions, subsequently. Storage configuration and management process 400 then proceeds to performing a storage cluster management process (420). An example of such a storage cluster management process is described in connection with FIG. 10 and its description, subsequently. Storage configuration and management process 400 then concludes, though it will be apparent that either of the foregoing processes can be performed multiple times and in any order deemed appropriate for the functionality needed.

Figure 5:
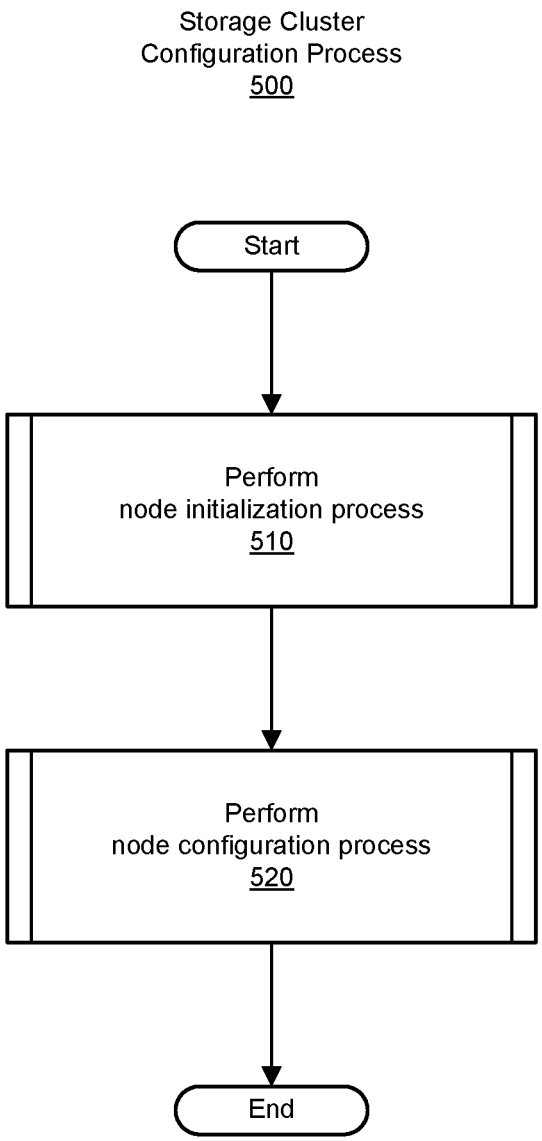
FIG. 5 is a flow diagram illustrating an example of storage cluster configuration process, according to one embodiment.

FIG. 5 is a flow diagram illustrating an example of storage cluster configuration process, according to one embodiment. FIG. 5 thus depicts storage cluster configuration process 500. Storage cluster configuration process 500, as its name implies, is directed to performing the basic functions in configuring a storage cluster according to embodiments such as those described herein, those being configuration and management of the storage cluster. Thus, storage cluster configuration process 500 begins by performing a node initialization process for at least one of the nodes in the storage cluster (510). An example of such a storage cluster management process is described in connection with FIG. 6 and its description, subsequently. Storage cluster configuration process 500 then proceeds to performing a node configuration process (520). An example of such a storage cluster configuration process is described in connection with FIGS. 7-9 and their respective descriptions, subsequently. Storage cluster configuration process 500 then concludes, though it will be apparent that the node configuration process can be performed multiple times, as necessary (e.g., to configure new nodes added to the storage cluster, as is described in greater detail in connection with FIG. 9 and its associated description, subsequently).

Figure 6:
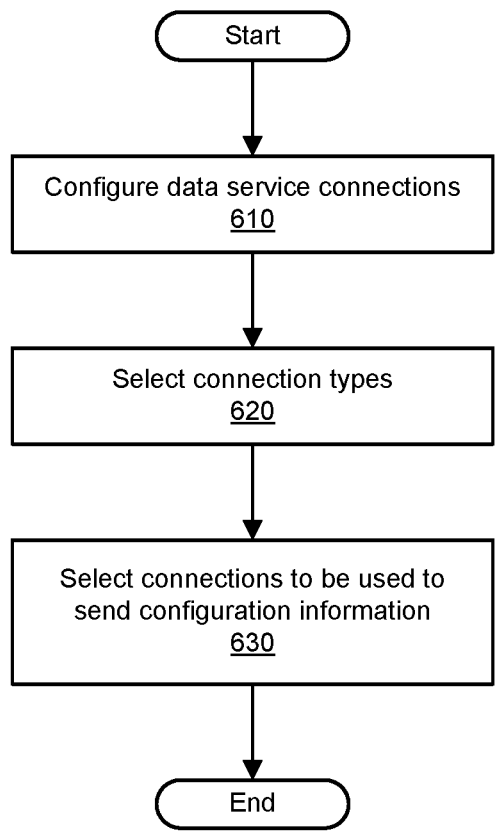
FIG. 6 is a flow diagram illustrating an example of a node initialization process, according to one embodiment.

FIG. 6 is a flow diagram illustrating an example of a node initialization process, according to one embodiment. FIG. 6 thus depicts a node initialization process 600, in the manner of that described in connection with storage cluster configuration process 500. Node initialization process 600 begins with the configuration of one or more data service connections (610). As noted earlier, in order to simplify the configuration of note interfaces, storage cluster nodes, in certain implementations, simply treat their network interfaces as data interfaces. Next, the connection type of each network interface connection of the given node is selected (620). One or more network connections are then selected for use in sending configuration information (e.g., the aforementioned configuration packages) (630). Node initialization process 600 then concludes.

Figure 7:
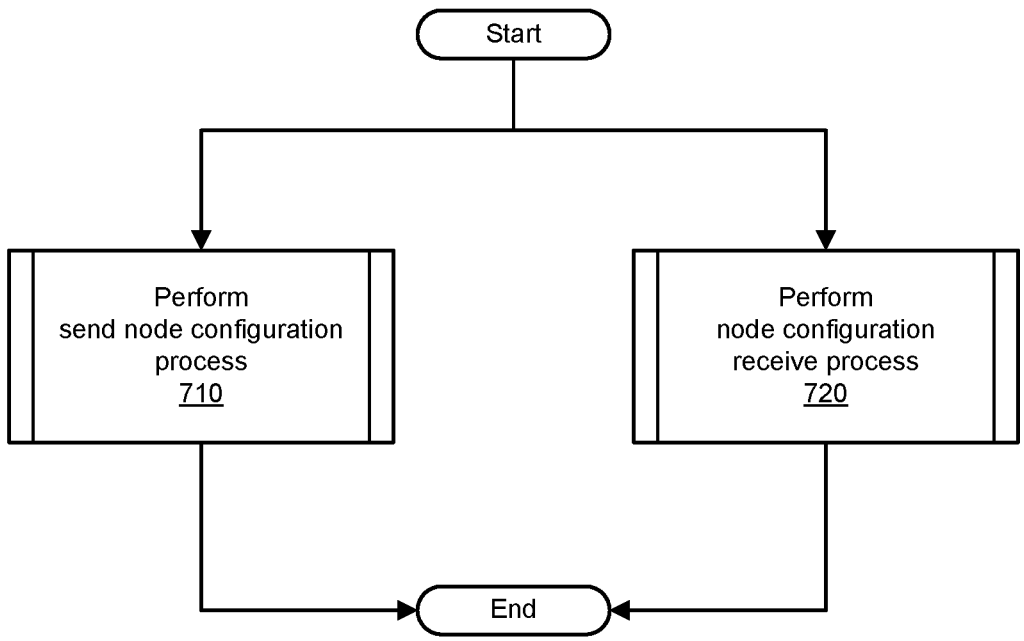
FIG. 7 is a flow diagram illustrating an example of a node configuration process, according to one embodiment.

FIG. 7 is a flow diagram illustrating an example of a node configuration process, according to one embodiment. FIG. 7 thus depicts a node configuration process 700. Node configuration process 700, in the example depicted in FIG. 7, includes operations representing processes for sending and receiving configuration packages. As is depicted in FIG. 7, these processes can be performed in a simultaneous or contemporaneous fashion, although it will be understood that such processes can, in the alternative, be performed in a serial fashion. As depicted in FIG. 7, a send node configuration process (710) and a node configuration received process (720) are performed, as depicted, in a contemporaneous fashion. Examples of such processes are described in connection with FIGS. 8-9 and their respective descriptions, subsequently. Node configuration process 700 then concludes, although it will be appreciated that, with the aforementioned processes performed contemporaneously, varying numbers of iterations may be performed and/or one or the other processes may conclude in less time, depending on the particular situation.

Figure 8:
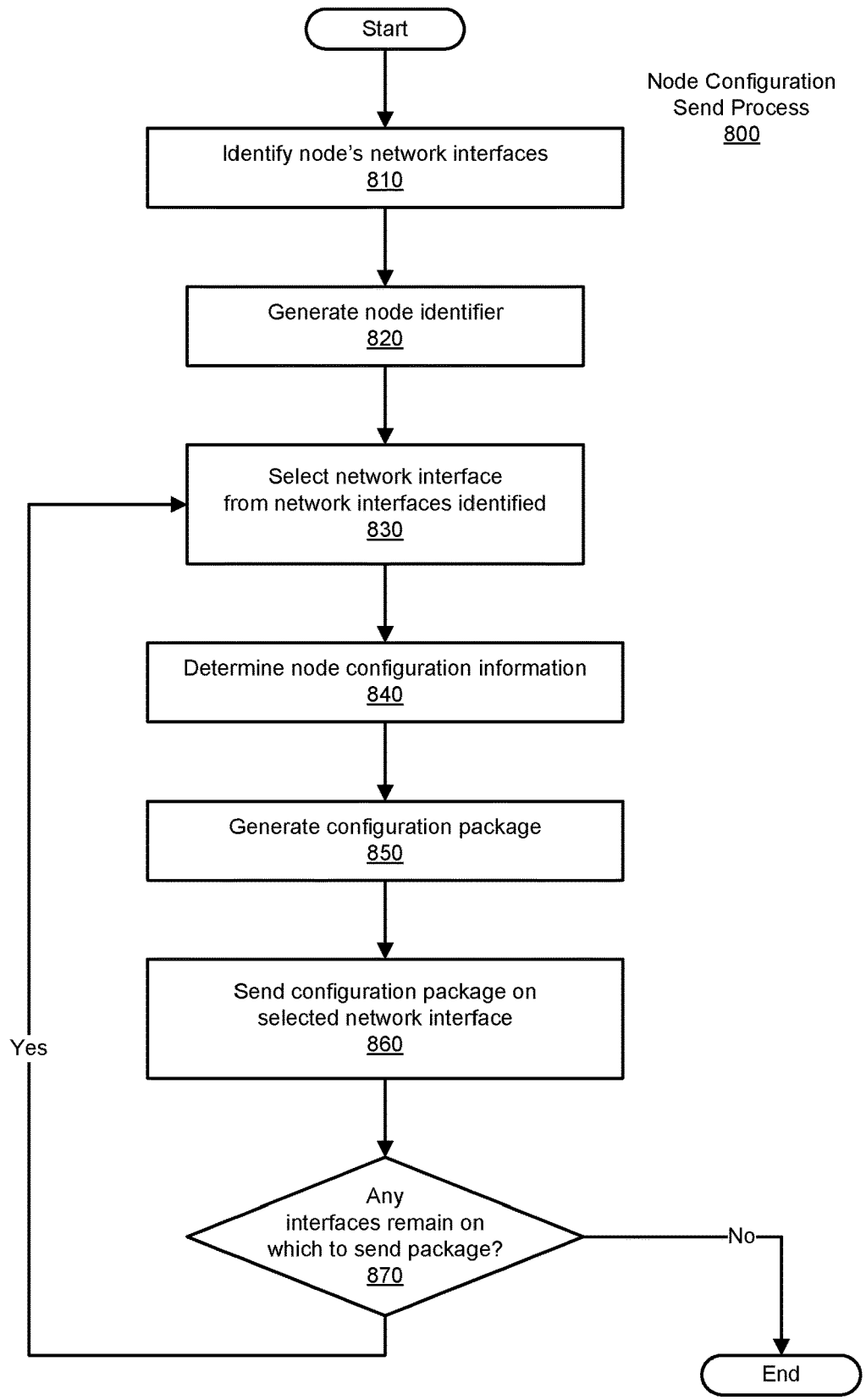
FIG. 8 is a flow diagram illustrating an example of a node configuration send process, according to one embodiment.

FIG. 8 is a flow diagram illustrating an example of a node configuration send process, according to one embodiment. FIG. 8 thus depicts a node configuration send process 800. Node configuration send process 800 begins with the node identifying its network interfaces (810). Next, the node in question generates its node identifier, for use in the generation of its configuration package (820). The node, having determined its network interfaces, selects one of those network interfaces from the network interfaces thus identified (830). A termination is then made as to the node's configuration information (840). Such node configuration information can include, for example, node network interface configuration information such as that described earlier in connection with the example of a configuration package in connection with FIG. 3 and Table 1. Having determined the requisite node configuration information and generated the node identifier for the given node, the node can proceed with generating its configuration package (850). Having generated the requisite configuration package, the node can send this configuration package on the selected network interface (860). Such a configuration package can be sent, for example, to other nodes in the storage cluster B0 a private network such as private network 150.

Having sent the configuration package thus generated on the selected network interface, the node then makes a determination as to whether any interfaces remain on which a configuration package needs to be sent (870). If additional interfaces remain on which a configuration package needs to be sent, node configuration send process 800 loops to selecting the next network interface from the network interfaces identified (830). Alternatively, if no interfaces remain for which a configuration package needs to be sent, node configuration send process 800 concludes.

Figure 9:
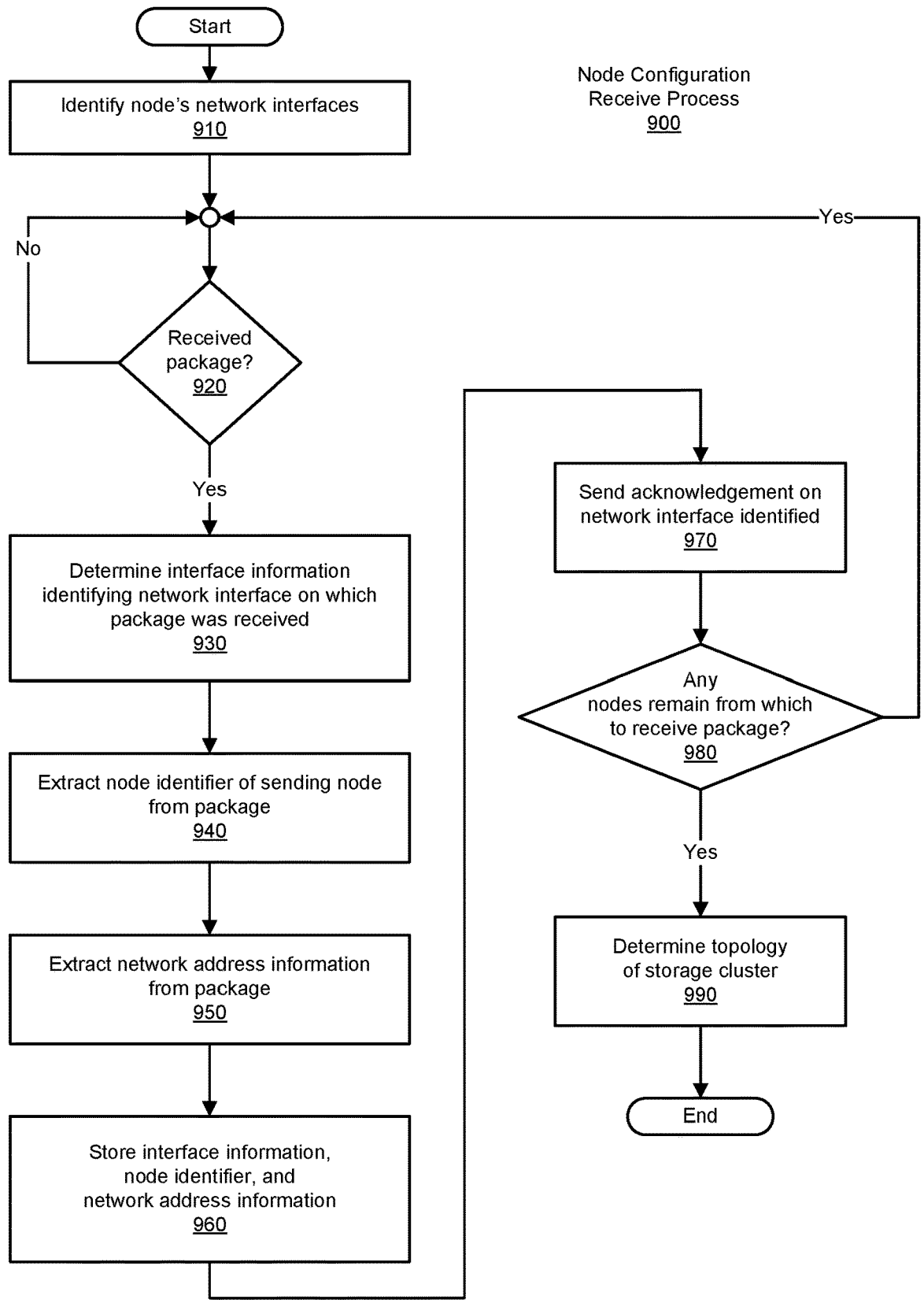
FIG. 9 is a flow diagram illustrating an example of a node configuration receive process, according to one embodiment.

FIG. 9 is a flow diagram illustrating an example of a node configuration receive process, according to one embodiment. FIG. 9 thus depicts a node configuration received process 900. Node configuration received process 900 begins with the identification of the node's network interfaces (line 10). As will be appreciated, the identification of such network interfaces can be performed once, for both node configuration send process 800 and node configuration received process 900, in certain implementations. Node configuration received process 900 proceeds to awaiting the receipt of one or more configuration packages from other nodes (920). Node configuration received process 900 loops until receiving one or more configuration packages, although it will be appreciated that, in the implementation depicted in FIG. 9, the determination as to whether any further configuration packages might be expected is made later in the process of node configuration received process 900.

Upon receipt of a configuration package, a determination is made as to interface information identifying the node's network interface on which the configuration package was received (930). In so doing, the given node is able to record the network interface on which such information was received, and so identify one or more other nodes communicatively coupled thereto. The node then extracts a node identifier of the sending node from the configuration package received (940). The node also extracts network address information from the configuration package (950). The node then stores the interface information, the node identifier, and network address information for later use in the topology determination (960). Having successfully obtained the requisite information, the given node then sends an acknowledgment to the sending node on the network interface identified (and on which the configuration package was received) (970).

As noted, a determination is made at this juncture as to whether one or more nodes remain from which configuration packages may be received (980). As will be appreciated in light of the present disclosure, such a determination may include a predefined list of nodes (which would then be available to refer to during node configuration received process 900), although other mechanisms could be employed to equally good effect (e.g., the use of a timer, a heartbeat signal from other nodes in the storage cluster, and/or other such mechanisms). In the case in which further nodes remain, node configuration received process 900 loops to awaiting the next configuration package (920). Alternatively, having received the requisite configuration packages, node configuration received process 900 proceeds with making a determination as to the topology of the storage cluster (990). In so doing, node configuration received process 900 provides a process for auto-detecting the topology of network connections within the storage system. Node configuration received process 900 then concludes An example of the foregoing is now presented. First, the nodes are initialized in the following manner:
1) The data service (e.g., NBU/MSDP, two public connections & two private connections) connections can select 4 high band interfaces.
   Settings for eth1:
      Supported ports: [TP]
      Speed: 1000 Mb/s
      Duplex: Full
      Port: Twisted Pair
      Link detected: yes
   Settings for eth5:
      Supported ports: [FIBRE]
      Speed: 25000 Mb/s
      Duplex: Full
      Port: FIBRE
      Link detected: yes
2) The data connection is used to select two as public connections and two as private connections.
3) Management interface is used to select from first low band interface which been connected.
4) Maintenance interface is used to select the first low band interface which been not connected.
5) A "NO USE" network interface is not connected.
6) After network interfaces have been selected, the information will send as configuration IP package broadcast to all interface.
7) In initialization stage, node only marks connections as data connections, and so does not distinguish between public and private connections.
Information table
{
{name:NodeA},
{
   {nic1,mac1,L,0},
   {nic2,mac2,L,1},
   {nic3,mac3,L,0},
   {nic4,mac4,L,0},
   {nic5,mac5,H,0},
   {nic6,mac6,H,0},
   {nic7,mac7,H,0},
   {nic8,mac8,H,0}
},
{send,nic1}
}
8) a node can receive other nodes information from each interface, as reflected in the example below
{
   {name:NodeB},
   {
      {nic1,mac1,L,0},
      {nic2,mac2,L,1},
      {nic3,mac3,L,0},
      {nic4,mac4,L,0},
      {nic5,mac5,H,0},
      {nic6,mac6,H,0},
      {nic7,mac7,H,0},
      {nic8,mac8,H,0}
   },
   {recv, nic1}
}
9) node receives broadcast information

TABLE 3

Broadcast configuration information.

| NIC1 | MAC1A | MAC1B | MAC1C | MAC1D |      |
|------|-------|-------|-------|-------|------|
| NIC2 | MAC2A | MAC2B | MAC2C | MAC2D | NIC2 |
| NIC3 | MAC3A | MAC3B | MAC3C | MAC3D |      |
| NIC4 | MAC4A | MAC4B | MAC4C | MAC4D |      |
| NIC5 | MAC5A | MAC5B | MAC5C | MAC5D | NIC5 |
| NIC6 | MAC6A | MAC6B | MAC6C | MAC6D | NIC6 |
| NIC7 | MAC7A | MAC7B | MAC7C | MAC7D | NIC7 |
| NIC8 | MAC8A | MAC8B | MAC8C | MAC8D | NIC8 |

The foregoing operations result in the storage cluster's nodes being configured. As before, in the example topology, the storage cluster includes four nodes (nodes A, B, C, and D). In the manner discussed earlier, devices representing network interface cards (NICs) 1-8 may send and receive media access control (MAC) information, and in this example, from each of the four nodes. Thus, the nodes and their interfaces are identified by their MAC addresses (MAC1A-MAC8A, MAC1B-MAC8B, MAC1C-MAC8C, and MAC1D-MAC8D).

Figure 10:
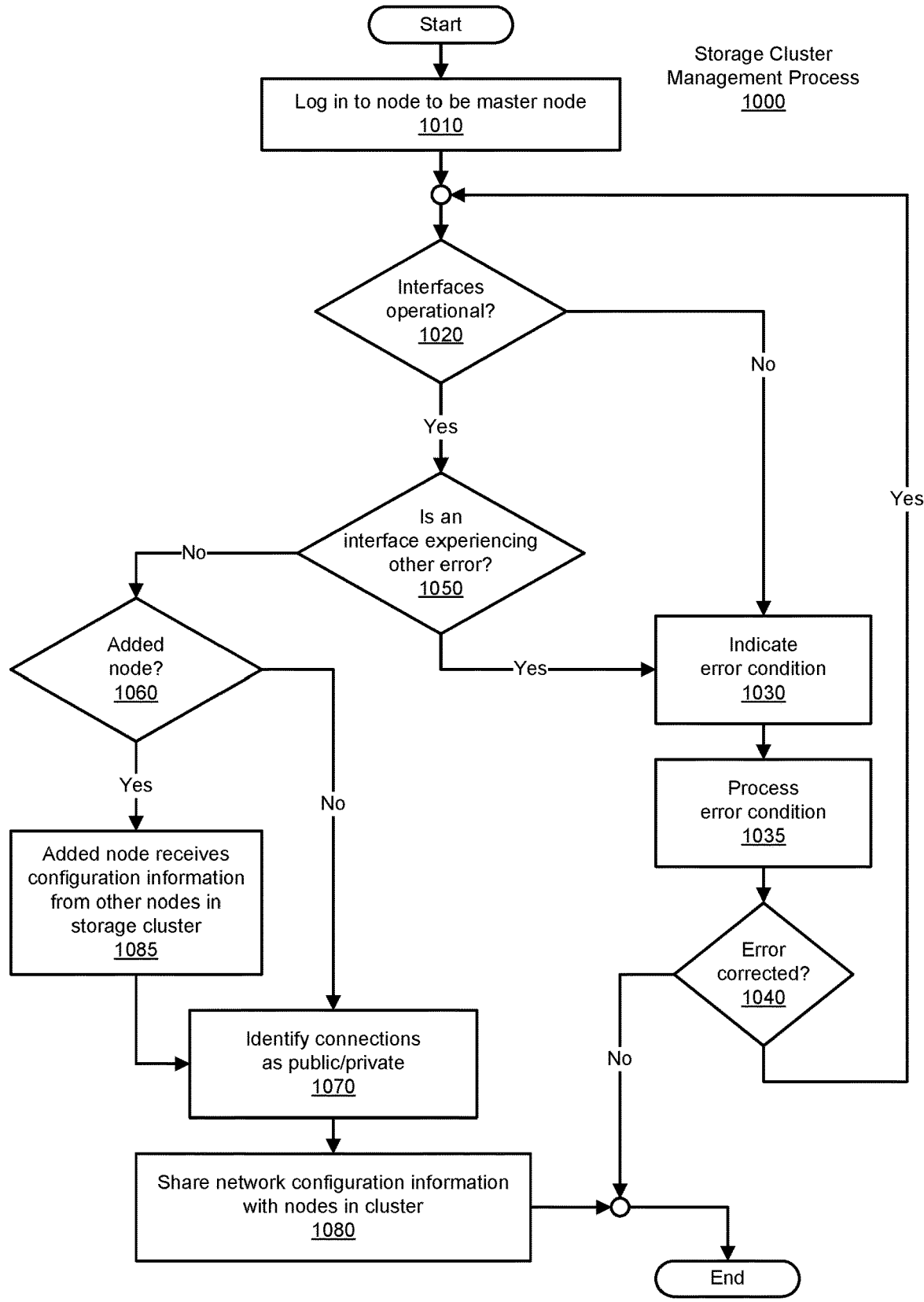
FIG. 10 is a flow diagram illustrating an example of storage cluster management process, according to one embodiment.

FIG. 10 is a flow diagram illustrating an example of storage cluster management process, according to one embodiment. FIG. 10 thus depicts a storage cluster management process 1000. Storage cluster management process 1000 begins with an administrator or other user logging in to one of the nodes in the storage cluster, which node is intended to be the master node for the cluster (1010). A determination is then made as to whether that node's network interfaces are operational (1020). If the network interfaces of the given node are not operational, and error condition is indicated to the administrator (1030). This error condition is then processed (e.g., whether automatically, by the administrator, or by a combination thereof) (1035). A determination is then made as to whether fear condition is been corrected (1040). If the error condition has not been corrected, storage cluster management process 1000 concludes. However, upon correction of the error condition, storage cluster management process 1000 loops to again making the determination as to whether the node's network interfaces are operational (1020).

In the case in which the node's network interfaces are operational, a determination is then made as to whether one of the network interfaces is experiencing any other errors (1050). In the case in which a network interface is experiencing other errors, storage cluster management process 1000 proceeds with indicating the error condition to the administrator (1030), and again attempting to process the error condition in the manner noted (1035). Once again, storage cluster management process 1000 makes a determination as to whether the error condition in question has been corrected (1040). In the case in which the error condition has not been corrected, storage cluster management process 1000 concludes. However, as before, if your condition has been corrected, storage cluster management process 1000 loops to the earlier determination as to whether the network interfaces in question are operational (1020) and whether a network interface is experiencing any other errors (1050). In so doing (e.g., in the case of a network connection error), an administrator can receive error information immediately (avoiding delays that might otherwise be experienced).

In the case in which the node's network interfaces are operational and none of those network interfaces are experiencing other errors, storage cluster management process 1000 proceeds with making a determination as to whether the node in question has been added to the storage cluster (1060). In the case in which the node into which the administrator has logged in as not been added, storage cluster management process 1000 proceeds with identifying connections as public or private (1070). The distinction between public and private networks can be seen with reference to FIGS. 1 and 2, and there constituent components. The pertinent network configuration information is then shared with other nodes in the cluster (1080). Storage cluster management process 1000 then concludes.

In the case in which a node has been added to the storage cluster, in the manner described previously, the added node receives configuration information from other nodes in the storage cluster in that manner (1085). As before, storage cluster management process 1000 proceeds with identifying connections as public or private (1070). The pertinent network configuration information is then shared with other nodes in the cluster (1080). Storage cluster management process 1000 then concludes.

An example of the foregoing is now presented. Maintenance proceeds in the following manner:

1. The node into which the administrator logs in acts as driver node to perform the configuration.
2. If all the interfaces encounter issues, the driver node will only see itself, and the administrator will process the error condition.
3. If one or more network interfaces encounter other connection problems, the administrator can receive error information and process the error condition.
4. Subsequently, when adding a new node, the newly-added node receives configuration information from its connection to the storage network, after which the administrator can process the addition.
5. In the earlier operations, public and private networks haven't been distinguished. The network interface can be used to probe the public interface (e.g., to a domain name server (DNS) server). If such an operation determines that such a server is not reachable outside (and so the connection is local), the interface will be identified as a private network interface.
6. The network configure information is shared between the storage cluster's nodes.

Maintenance operations according to methods and systems such as those described herein is then complete.

An Example Computing and Network Environment

As noted, the systems described herein can be implemented using a variety of computer systems and networks. The following illustrates an example configuration of a computing device such as those described herein. The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections. While a single system bus is illustrated for ease of understanding, it should be understood that the system buses may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, or the like.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors 502 to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, etc.) and wireless networks (e.g., WLAN, GSM, CDMA, 802.11, Bluetooth, Wireless USB, ZigBee, cellular, satellite, etc.), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory 504 and mass storage devices, may be used to store software and data, such as, for example, an operating system, one or more drivers (e.g., including a video driver for a display such as display 110), one or more applications, and data. Examples of such computing and network environments are described below with reference to FIGS. 11 and 12.

Figure 11:
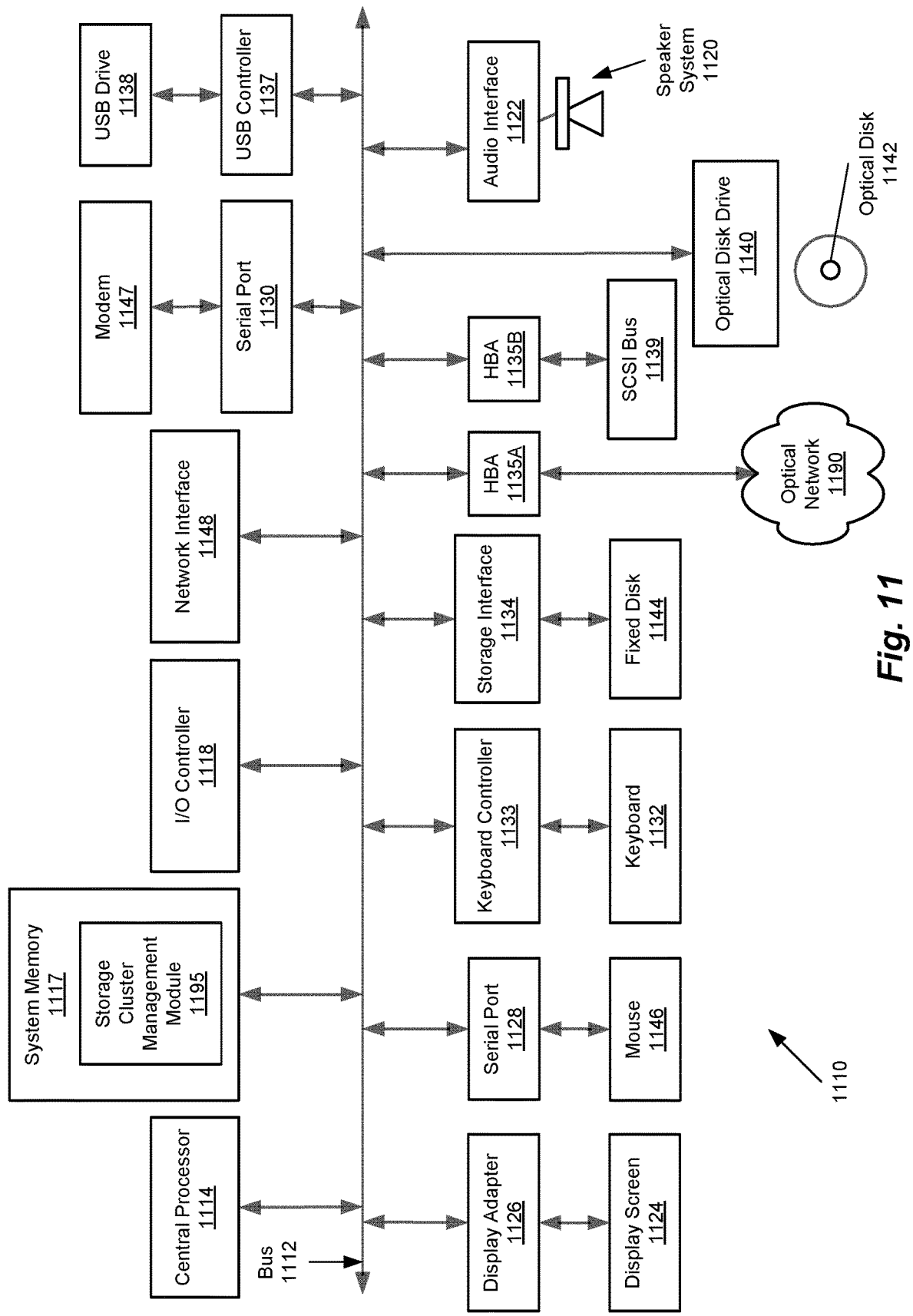
FIG. 11 is a simplified block diagram illustrating components of an example computer system suitable for implementing embodiments of the present disclosure, according to one embodiment.

FIG. 11 depicts a block diagram of a computer system 1110 suitable for implementing aspects of the systems described herein. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a USB controller 1137 operative to receive a USB drive 1138, a host bus adapter (HBA) interface card 1135A operative to connect with a optical network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1110 are generally stored on and accessed from a computer-readable storage medium, such as a hard disk drive (e.g., fixed disk 1144), an optical drive (e.g., optical drive 1140), a universal serial bus (USB) controller 1137, or other computer-readable storage medium.

Storage interface 1134, as with the other storage interfaces of computer system 1110, can connect to a standard computer-readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like. Also depicted as part of computer system 1110 is a storage cluster management module 1195, which is resident in system memory 1117 and provides functionality and operations comparable to the storage cluster configuration and management processes described earlier herein.

Many other devices or subsystems (not shown) may be connected in a similar manner (e.g., document scanners, digital cameras and so on). Conversely, all of the devices shown in FIG. 11 need not be present to practice the systems described herein. The devices and subsystems can be interconnected in different ways from that shown in FIG. 11. The operation of a computer system such as that shown in FIG. 11 will be readily understood in light of the present disclosure. Code to implement portions of the systems described herein can be stored in computer-readable storage media such as one or more of system memory 1117, fixed disk 1144, optical disk 1142, or USB drive 1138. The operating system provided on computer system 1110 may be WINDOWS, UNIX, LINUX, IOS, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 12:
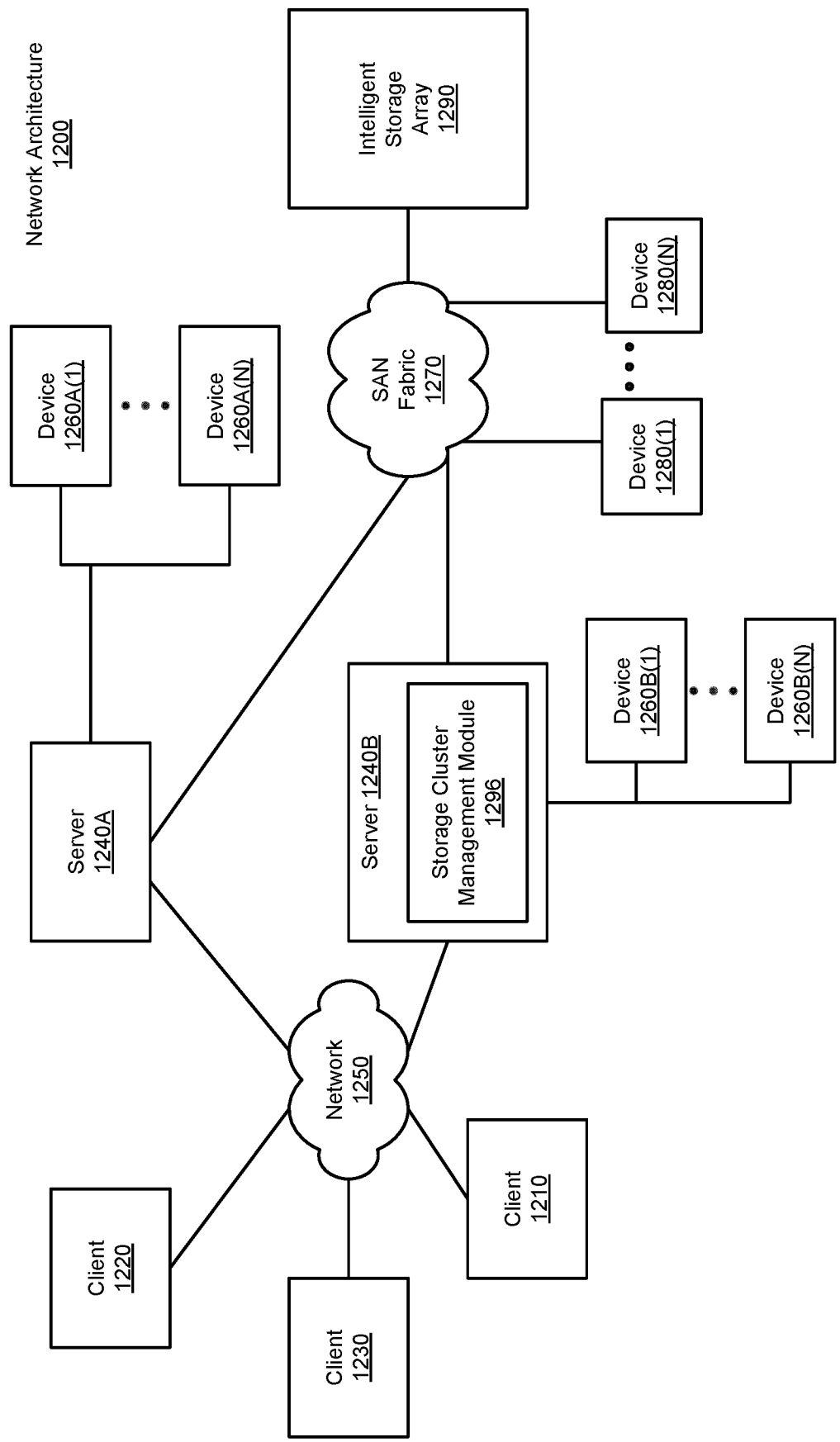
FIG. 12 is a simplified block diagram illustrating components of an example computer system suitable for implementing embodiments of the present disclosure, according to one embodiment.

FIG. 12 is a block diagram depicting a network architecture 1200 in which client systems 1210, 1220 and 1230, as well as storage servers 1240A and 1240B (any of which can be implemented using computer system 1210), are coupled to a network 1250. Storage server 1240A is further depicted as having storage devices 1260A(1)-(N) directly attached, and storage server 1240B is depicted with storage devices 1260B(1)-(N) directly attached. Storage servers 1240A and 1240B are also connected to a SAN fabric 1270, although connection to a storage area network is not required for operation. SAN fabric 1270 supports access to storage devices 1280(1)-(N) by storage servers 1240A and 1240B, and so by client systems 1210, 1220 and 1230 via network

1250. An intelligent storage array 1290 is also shown as an example of a specific storage device accessible via SAN fabric 1270.

Also depicted as part of network architecture 1200 is a storage cluster management module 1296 (installed in server 1240B), which is comparable in function and operation to various of the storage cluster management modules described earlier herein. For example, using the components depicted in FIG. 2, storage cluster management module 1296 can provide functionality associated with the configuration and management of the nodes depicted in, and described in connection, therewith.

With reference to computer system 1110, modem 1147, network interface 1148 or some other method can be used to provide connectivity from each of client computer systems 1210, 1220 and 1230 to network 1250. Client systems 1210, 1220 and 1230 are able to access information on storage server 1240A or 1240B using, for example, a web browser or other client software (not shown). Such a client allows client systems 1210, 1220 and 1230 to access data hosted by storage server 1240A or 1240B or one of storage devices 1260A(1)-(N), 1260B(1)-(N), 1280(1)-(N) or intelligent storage array 1290. FIG. 12 depicts the use of a network such as the Internet for exchanging data, but the systems described herein are not limited to the Internet or any particular network-based environment.

Other Embodiments

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement pre-scribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components (e.g., the various elements shown as components of computer system 1110). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
performing a cluster configuration process at a node of a plurality of nodes of a storage cluster, the cluster configuration process comprising
performing a node initialization process, comprising
configuring a plurality of data service connections,
selecting a connection type of a plurality of connection types for each of the plurality of data service connections,
selecting one or more selected data service connections of the plurality of data service connections, wherein
each node of the plurality of nodes is a storage appliance of a plurality of storage appliances,
each of the one or more selected data service connections corresponds to one or more physical network interfaces of a plurality of physical network interfaces of the node, and
each of the plurality of physical network interfaces is configured to be communicatively coupled to a network of a plurality of networks,
selecting a selected physical network interface from the one or more physical network interfaces, wherein
the selected physical network interface is configured to be coupled to a first network of the plurality of networks,
a second network of the plurality of networks is configured to facilitate communication between one or more nodes of the plurality of nodes and a computer system external to the storage cluster, and
the node communicates with one or more other nodes of the plurality of nodes via the first network using the selected physical network interface,
generating a configuration package, wherein
the configuration package comprises
a node identifier, and
first node configuration information,
node configuration information comprises network interface configuration information for each physical network interface of the plurality of physical network interfaces, and
the node identifier uniquely identifies the node among the plurality of nodes,
sending the configuration package on the selected physical network interface,
receiving a received configuration package from a sending node, wherein the sending node is a one of the plurality of nodes, and
determining a topology of the storage cluster, wherein the topology of the storage cluster is determined based, at least in part, on the first node configuration information and network information in the received configuration package.

2. The method of claim 1, further comprising:
generating the node identifier, wherein
the node identifier is generated by the node, and
the node identifier is unique to the node.

3. The method of claim 2, further comprising:
determining the first node configuration information.

4. The method of claim 3, wherein
the first node configuration information comprises at least one of
a hardware type,
a protocol type, or
an operation.

5. The method of claim 4, wherein
the node is a sender node, and
the first node configuration information further comprises
a sender hardware address, and
a sender protocol address.

6. The method of claim 4, wherein
the one or more other nodes of the plurality of nodes is a target node, and
the first node configuration information further comprises
a target hardware address, and
a target protocol address.

7. The method of claim 1, further comprising:
identifying the plurality of physical network interfaces of the node.

8. The method of claim 1, further comprising:
extracting a sending node identifier from the received configuration package, wherein
the sending node identifier uniquely identifies the sending node among the plurality of nodes; and
extracting the network information from the received configuration package.

9. The method of claim 8, wherein
the selecting, the generating, and the sending are performed contemporaneously with the receiving, the extracting the sending node identifier, and the extracting the network information.

10. The method of claim 8, wherein
the network information comprises network address information, and
the network address information comprises a network address of the sending node.

11. The method of claim 10, wherein
the received configuration package is one of a plurality of received configuration packages,
each of the plurality of received configuration packages comprises a corresponding sending node identifier of a plurality of sending node identifiers and a corresponding network address of a plurality of network addresses, and
the method further comprises
determining a topology of the storage cluster, wherein the topology of the storage cluster is determined based, at least in part, on the plurality of sending node identifiers and the plurality of network addresses.

12. The method of claim 1, wherein
the received configuration package was generated by the sending node performing the cluster configuration process.

13. The method of claim 12, wherein the determining the topology comprises:
associating each other node of the plurality of nodes with at least one data service connection of the plurality of data service connections by storing an address of the each other node of the plurality of nodes in a network connection topology table, wherein the each other node of the plurality of nodes is other than the node.

14. A non-transitory computer-readable storage medium, comprising program instructions, which, when executed by one or more processors of a computing system, perform a method comprising:
performing a cluster configuration process at a node of a plurality of nodes of a storage cluster, the cluster configuration process comprising
performing a node initialization process, comprising
configuring a plurality of data service connections,
selecting a connection type of a plurality of connection types for each of the plurality of data service connections,
selecting one or more selected data service connections of the plurality of data service connections, wherein
each node of the plurality of nodes is a storage appliance of a plurality of storage appliances,
each of the one or more selected data service connections corresponds to one or more physical network interfaces of a plurality of physical network interfaces of the node, and
each of the plurality of physical network interfaces is configured to be communicatively coupled to a network of a plurality of networks,
selecting a selected physical network interface from the one or more physical network interfaces, wherein
the selected physical network interface is configured to be coupled to a first network of the plurality of networks,
a second network of the plurality of networks is configured to facilitate communication between one or more nodes of the plurality of nodes and a computer system external to the storage cluster, and
the node communicates with one or more other nodes of the plurality of nodes via the first network using the selected physical network interface,
generating a configuration package, wherein
the configuration package comprises
a node identifier, and
first node configuration information,
node configuration information comprises network interface configuration information for each physical network interface of the plurality of physical network interfaces, and
the node identifier uniquely identifies the node among the plurality of nodes,
sending the configuration package on the selected physical network interface,
receiving a received configuration package from a sending node, wherein the sending node is a one of the plurality of nodes, and
determining a topology of the storage cluster, wherein the topology of the storage cluster is determined based, at least in part, on the first node configuration information and network information in the received configuration package.

15. The non-transitory computer-readable storage medium of claim 14, wherein the method further comprises:
generating the node identifier, wherein
the node identifier is generated by the node, and
the node identifier is unique to the node; and
determining the first node configuration information, wherein
the first node configuration information comprises at least one of
a hardware type,
a protocol type, or
an operation.

16. The non-transitory computer-readable storage medium of claim 14, wherein the method further comprises:
extracting a sending node identifier from the received configuration package, wherein
the sending node identifier uniquely identifies the sending node among the plurality of nodes; and
extracting the network information from the received configuration package, wherein
the selecting, the generating, and the sending are performed contemporaneously with the receiving, the extracting the sending node identifier, and the extracting the network information.

17. The non-transitory computer-readable storage medium of claim 16, wherein
the network information comprises network address information,
the network address information comprises a network address of the sending node,
the received configuration package is one of a plurality of received configuration packages,
each of the plurality of received configuration packages comprises a corresponding sending node identifier of a plurality of sending node identifiers and a corresponding network address of a plurality of network addresses, and
the method further comprises
determining a topology of the storage cluster, wherein the topology of the storage cluster is determined based, at least in part, on the plurality of sending node identifiers and the plurality of network addresses.

18. The non-transitory computer-readable storage medium of claim 14, wherein the determining the topology comprises:
associating each other node of the plurality of nodes with at least one data service connection of the plurality of data service connections by storing an address of the each other node of the plurality of nodes in a network connection topology table, wherein the each other node of the plurality of nodes is other than the node.

19. A computing system comprising:
one or more processors; and
a computer-readable storage medium coupled to the one or more processors, comprising program instructions, which, when executed by the one or more processors, perform a method comprising
performing a cluster configuration process at a node of a plurality of nodes of a storage cluster, the cluster configuration process comprising
performing a node initialization process, comprising
configuring a plurality of data service connections, selecting a connection type of a plurality of connection types for each of the plurality of data service connections, selecting one or more selected data service connections of the plurality of data service connections, wherein each node of the plurality of nodes is a storage appliance of a plurality of storage appliances, each of the one or more selected data service connections corresponds to one or more physical network interfaces of a plurality of physical network interfaces of the node, and each of the plurality of physical network interfaces is configured to be communicatively coupled to a network of a plurality of networks, selecting a selected physical network interface from the one or more physical network interfaces, wherein the selected physical network interface is configured to be coupled to a first network of the plurality of networks, a second network of the plurality of networks is configured to facilitate communication between one or more nodes of the plurality of nodes and a computer system external to the storage cluster, and the node communicates with one or more other nodes of the plurality of nodes via the first network using the selected physical network interface, generating a configuration package, wherein the configuration package comprises a node identifier, and first node configuration information, node configuration information comprises network interface configuration information for each physical network interface of the plurality of physical network interfaces, and the node identifier uniquely identifies the node among the plurality of nodes, sending the configuration package on the selected physical network interface, receiving a received configuration package from a sending node, wherein the sending node is a one of the plurality of nodes, and determining a topology of the storage cluster, wherein the topology of the storage cluster is determined based, at least in part, on the first node configuration information and network information in the received configuration package.

\* \* \* \* \*